M. SHEINMAN.

Reissued July 8, 1913. ALARM LOCK. 13,594.

APPLICATION FILED JUNE 5, 1913.

2 SHEETS—SHEET 1.

WITNESSES:

C. Bartels.

INVENTOR

Morris Sheinman

BY

Priswell & Priswell

ATTORNEYS

M. SHEINMAN.

ALARM LOCK.

Reissued July 8, 1913. 13,594.

APPLICATION FILED JUNE 5, 1913.

2 SHEETS—SHEET 2.

WITNESSES:

J. Edwin Smith

C. Bartels.

INVENTOR

Morris Sheinman

BY

Criswell & Criswell

ATTORNEYS

COLUMBIA PLANOGRAPH CO., WASHINGTON, D. C.

UNITED STATES PATENT OFFICE.

MORRIS SHEINMAN, OF NEW YORK, N. Y., ASSIGNOR TO AUTOMATIC ALARM LOCK COMPANY, INC., OF NEW YORK, N. Y., A CORPORATION OF NEW YORK.

ALARM-LOCK.

13,594. Specification of Reissued Letters Patent. Reissued July 8, 1913.

Original No. 994,542, dated June 6, 1911, Serial No. 455,299. Application for reissue filed June 5, 1913. Serial No. 772,017.

*To all whom it may concern:*

Be it known that I, MORRIS SHEINMAN, a citizen of the United States, and a resident of New York, county and State of New York, have invented certain new and useful Improvements in Alarm-Locks, of which the following is a full, clear, and exact description.

This invention relates more particularly to a lock applied to doors which will automatically sound an alarm or otherwise signal when the lock is tampered with.

The primary object of the invention is to provide a simple and efficient lock in which the usual bolt may be made to coöperate with mechanism in such a way that an alarm or signal will be given immediately the door is opened, in case a burglar should attempt to pry the door with a chisel or other tool, or to cut the bolt, but which will permit the mechanism to so act with relation to the bolt that the said bolt may be operated by a key or the means usually employed for throwing the bolt without sounding the alarm.

Another object of the invention is to provide simple and efficient mechanism which is adapted to automatically close a normally open electric circuit in which a bell or other signal is included, thereby providing safety means to indicate that the door has been opened in an irregular way.

A further object of the invention is to provide a device in which two cylinder locks adapted to be operated by the same key form a part thereof, one of which is carried by the door and the other by the device, and which serve to permit the bolt to be thrown either to a locking or unlocked position.

A still further object of the invention is to provide a simple and efficient lock in which the parts may be readily made and assembled.

With these and other objects in view, the invention will be hereinafter more particularly described with reference to the accompanying drawings, which form a part of this specification, and will then be pointed out in the claims at the end of the description.

Figure 1:
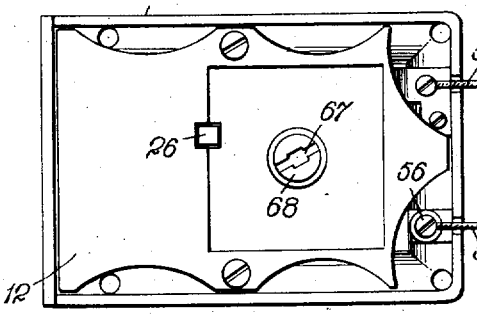
Figure 2:
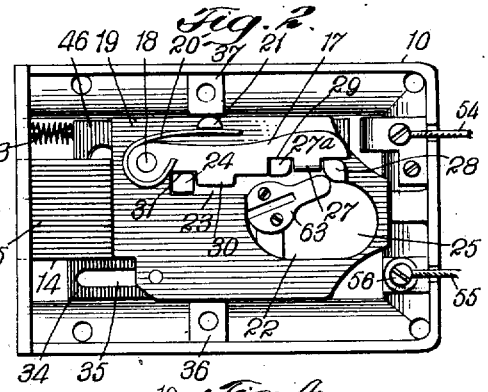
Figure 3:
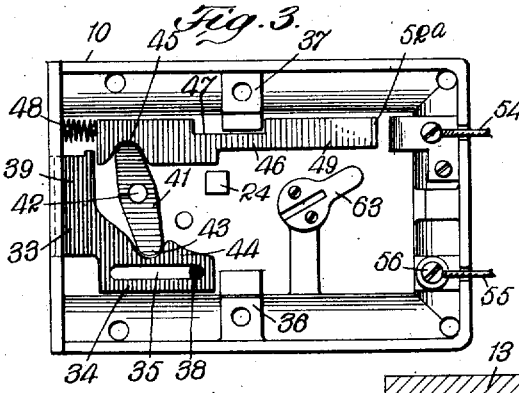
Figure 4:
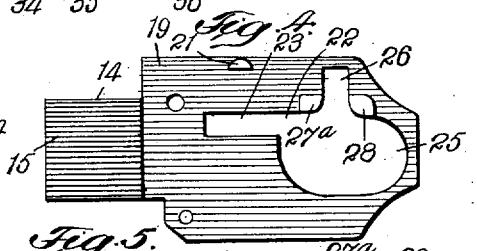
Figure 5:
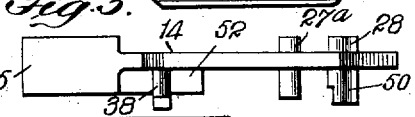
Figure 6:
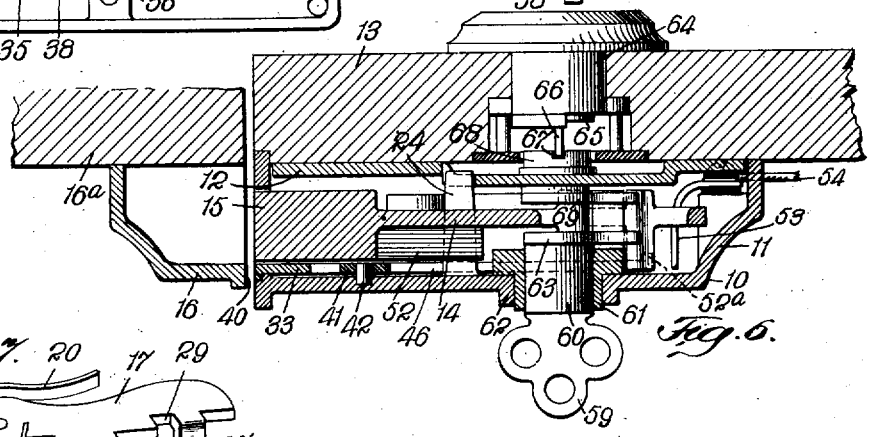
Figure 7:
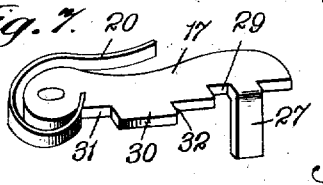
Figure 8:
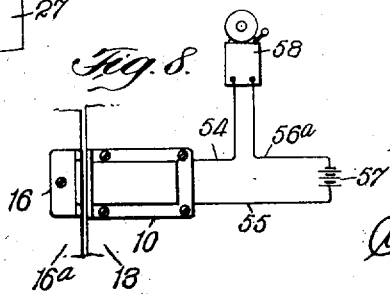
Figure 9:
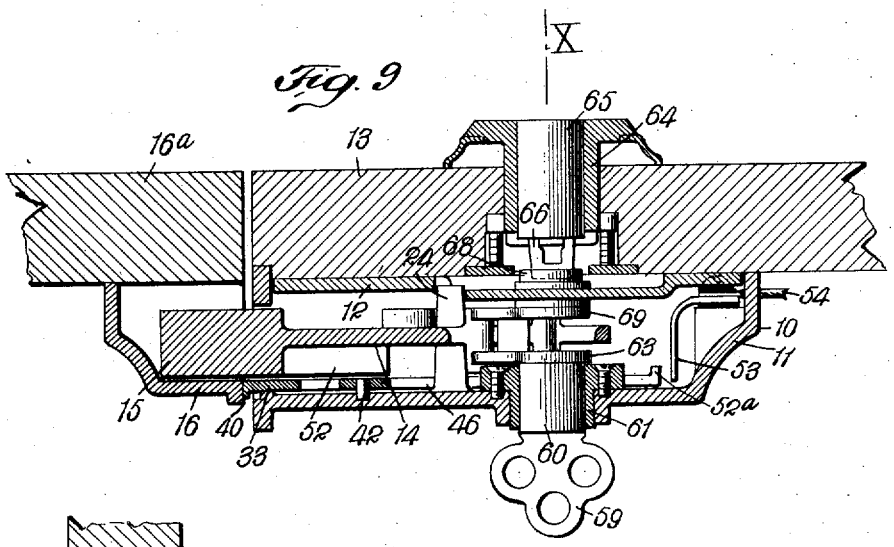
Figure 10:
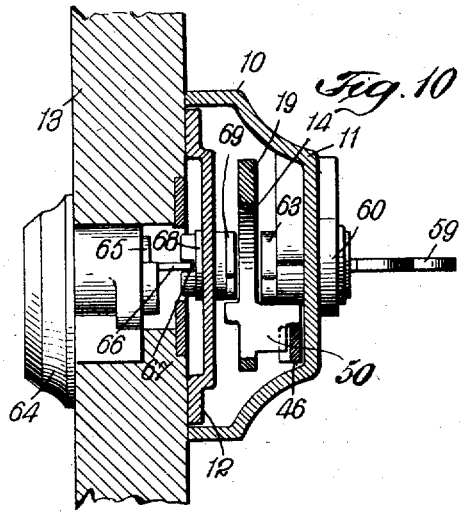
Figure 11:
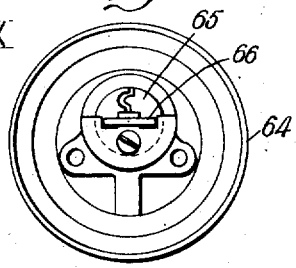

In the drawings, Figure 1 is a rear elevation of one form of lock embodying my invention. Fig. 2 is a view showing the cover plate removed and the bolt thrown to an unlocked position. Fig. 3 is a view showing the mechanism for closing an electric circuit to sound an alarm, the bolt being removed. Fig. 4 is a detail view of the bolt. Fig. 5 is a detail plan of the bolt. Fig. 6 is a sectional plan view on a larger scale. Fig. 7 is a detail perspective view of the tumbler. Fig. 8 is an elevation of the lock, showing diagrammatically the electric circuit and an alarm. Fig. 9 is a sectional view somewhat similar to Fig. 6, the bolt being thrown to a locked position. Fig. 10 is a transverse section, taken on the line X—X of Fig. 9. Fig. 11 is a view looking at the interior of the cylinder lock attached to the door; and Fig. 12 is an elevation of the bolt looking at the side opposite to that shown in Figs. 2 and 4.

The casing 10 of the lock may be of any suitable construction. As shown it has a member 11 in which the mechanism is located and which is substantially box-shaped and has its inner surface covered by a plate member 12 which may be secured thereto by screws or otherwise, and serves to hold the mechanism within the casing in the usual manner. The casing may be held to the door 13 by screws and movable in the casing is a bolt 14. This bolt has an engaging part 15 adapted to be moved in the keeper 16 which is held to the door jamb $16^a$ as usual, and carried by the bolt is a tumbler 17. The tumbler 17 is pivotally held at 18 to the body portion 19 of said bolt, and said tumbler is normally forced inward by a spring 20, one end of which is held to the tumbler and the other end rests against a lug or projection 21 projecting from the body portion 19. The body of the bolt is provided with an opening 22 therethrough and this opening has an extended slot-like part 23 which fits about a lug or projection 24 carried by the lock casing and which serves to guide the bolt in its movement, and said opening has an enlarged substantially oval-shaped part 25 and a slot-like part 26 at substantially right angles to the part 23 and in which an arm or projecting part 27 of the tumbler 17 is adapted to fit. On opposite sides of the slot-like part 26 are lugs or engaging parts $27^a$ and 28 between which the part 27 is adapted to move when the tumbler or dog is moved on its pivot, and said tumbler is provided with a recess or slot 29 which is adapted to fit about the projection 27[a] and is provided with a projecting part or engaging portion 30 forming a recess 31 in which is adapted to fit the lug 24 of the casing. When the tumbler 17 is moved on its pivot as will be presently described, the arm or projection 27 will be forced back of the projections 27[a] and 28 and will force the part 30 of the tumbler free of the lug 24, so that the tumbler and bolt may be moved bodily together to a locking position, in which case the edge or side 32 will engage the lug or projection 24 on the opposite side thereof so that the bolt will be held against movement in its locked position, unless the tumbler is again released.

To automatically close an electric circuit and to sound an alarm or signal and prevent the door from being opened or the bolt from being moved or otherwise tampered with except by the proper key, I arrange within the casing an element or member 33. This member 33 is slidingly held in the casing and is movable independently of the bolt 14 and has a part 34 in which is a slot 35, and said member or element 33 may have its inward movement limited by the lug or projection 36, which with the lug or projection 37 of the casing, serves as a fastening means for the plate 12 and also as a guide for the bolt 14 during the movement thereof, said plate 12 being provided with an opening in which the outer end of the lug 24 is adapted to fit. A pin or projection 38 extends from one side of the bolt 14 and has its end entering the slot 35 of the member 33 so that the said member may have a movement independent relatively to that of the bolt, but which may be moved with the bolt when the latter is thrown in either direction by the proper means. This member 33 may be plate-like in form and has a head or part 39 which is adapted to engage the outer edge 40 of the keeper 16, Fig. 9, when the bolt is forced to a locked position, and tending normally to force the member or device 33 outward is a lever or element 41. This lever 41 is pivoted at 42 to the lock casing and has one end rounded, as at 43, and adapted to fit a recess in the part 44, and the other end of said lever is round, as at 45, and is adapted to fit a recess in a slidable device or element 46. The device 46 may be bar-like in form and is slotted at one edge, as at 47, to fit about the lug or projection 37 and to have a limited movement in the lock casing, and said device 46 is normally forced in one direction by a spring 48, one end of which rests against one wall of the casing and the other end against the device. This device is normally forced inward by the spring 48 and tends to force the member 33 outward, so that the said member 33 will follow the bolt when thrown to a locked position, but will be prevented from moving to an extreme throw by the reason of the edge 40 of the keeper 16, and when the bolt is thrown to an unlocked position, the said member 33 will be moved to the position shown in Fig. 3 by reason of the pin or projection 38 engaging the end of the slot 35, and this forces the device or bar 46 against the action of the spring 48.

Figure 12:
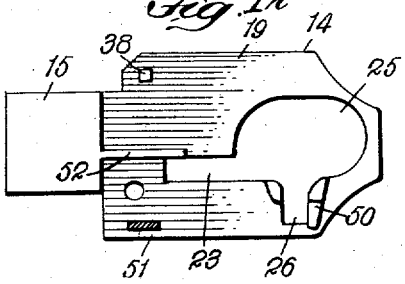

The bar or device 46 is held against the inner surface of the cover plate member 12 of the casing and is notched or cut away, as at 49, so as to be guided by the lug or projection 50 of the bolt 14 which is notched at one end for this purpose, and said bar 46 is further held to slide in the casing by a lug or projection 51, Fig. 12, which rests upon the surface of said bar or device 46. The bolt 14 is provided with a wing or ribbed portion 52 which is adapted to engage the lever 41 and member 33 serving to movably hold the same against the casing plate 12. The bar or device 46 serves as a contact and for this purpose has one end bent, as at 52[a], which is adapted to engage the end of a contact 53. The contact 53 may have its free end yielding and is secured to the casing so as to be insulated therefrom, and connected to this contact is a wire 54. A wire 55 is electrically connected to the casing 10, as by a screw 56, and these wires form a part of an electric circuit 56[a] in which is included a battery 57 and a bell 58 or other form of signal.

It will be seen that when the bolt is in an unlocked position, the member 33 will be forced inward, and in this position will hold the contact 52[a] of the device 46 away from the contact 53, as shown in Figs. 2 and 3, so that the alarm will not ring, but on the outward movement or throw of the member 33 due to the action of the spring 48, the bar 46 will be forced inward so that the end 52[a] will engage the contact 53 and close the circuit, unless the outward throw of said member 33 is limited by the action of the keeper 16 as shown best in Fig. 9. If an attempt is made to force the door by means of a chisel or other tool or cutting the bolt or otherwise, and the door is forced slightly inward on its hinges, the member 33 will be released so that it will be forced to its extreme outward throw, and during this action a contact will be made between the bar 46 and contact 53, thereby completing the circuit. By this means any attempt to open the door except in the proper way will cause the alarm to be sounded.

The bolt 14 may be thrown to a locked or unlocked position in any desired way. As shown the said bolt may be thrown from either side of the door by the same key, as 59, Figs. 6 and 9, and this key is adapted to fit into a drum or cylinder 60 which is rotatably held in a sleeve 61 when it is desired to throw the bolt from the inside, and said sleeve is held against rotation in a boss 62 forming a part of the lock casing. The drum or cylinder 60 is normally held against rotation except when released by the key and this mechanism is substantially the same as in the Yale type of lock and may be of any other desired character. An arm 63 is held to rotate with the cylindrical lock member 60, and this arm is adapted to engage the projecting part 27 of the tumbler or dog 17 to release the same from the lug 24 so that the bolt may be thrown in either direction. A second cylindrical lock 64 is held to the door in the usual way and this lock has a rotary cylinder, drum or member 65 which is adapted to be moved by the same key 59 as already described, and movable with this drum is a projecting part 66 which enters a slot 67 in a rotary sleeve or element 68 which is held to the cover plate 12. This sleeve 68 carries an arm 69 similar to the arm 63, and said arm is adapted to operate the dog to release the same and to throw the bolt inward or outward in the same way as said arm 63. As the bolt is thrown outward, the member 33 will follow the same by reason of the action of the spring 48 and device 46 as already described, and will be stopped by the keeper so that the circuit will remain open until the door is tampered with. If the door is opened, except by the proper key, this will permit the member or device 33 to be forced outward so as to permit the bar 46 to engage the contact 53 and complete the circuit through the alarm 58, while when the bolt is thrown to an unlocked position by the key from either the inside or the outside, the pin or projection 38 carried by the bolt and entering the slot 35, will force the member 33 inward and this will open the circuit by moving the bar 46, as shown in Fig. 3. The member 33 also serves as a means for protecting the bolt 14 and by means of the two cylindrical locks coöperating as shown to move the bolt, the same key may be employed on either side of the door, and by having the inner cylindrical lock, instead of a handle or knob, it will be difficult for the lock to be tampered with should a hole be made in the door in an attempt to operate the lock from the inside. The mechanism for releasing the rotary member of each of the cylindrical locks by the key is not shown as the same is of the usual construction.

From the foregoing it will be seen that a simple and efficient lock is provided whereby an alarm may be sounded when the door is tampered with and opened except by the proper key; that by the means shown the same key may be employed for throwing the bolt from either the inside or outside of the door; that simple means is provided for preventing tampering with the bolt of the lock; that the bolt may be operated by the proper means without causing the alarm to ring; and that said lock may be readily made and assembled.

Having thus described my invention, I claim as new and desire to secure by Letters Patent:—

1. In a lock, the combination with a casing, of a bolt, means whereby the bolt may be thrown to a locked or unlocked position, a keeper, a sliding member movable with the bolt and independently thereof, a sliding contact bar, means arranged intermediate said slidable member and contact bar whereby the movement of one will throw the other in the opposite direction, means tending normally to throw said contact bar inwardly and through said intermediate means to throw said slidable member outwardly against said keeper, a contact adapted to be engaged by said contact bar, an alarm, and electrical connections including said alarm, the circuit through which is closed by the movement of said contact bar.

2. In a lock, the combination with a casing, of a bolt, means whereby the bolt may be thrown to locked or unlocked position, a keeper, a movable member located adjacent to the bolt and movable with and independently thereof, a sliding spring pressed contact bar, means arranged intermediate said movable member and contact bar whereby the movement of one will throw the other in the opposite direction, an alarm, electrical connections including said alarm, and contact bar, the circuit through which is closed by the movement of said contact bar.

3. In a lock, the combination with a casing, of a bolt, means whereby the bolt may be thrown to a locked or unlocked position, a keeper, a movable member located adjacent to the bolt and movable with and independently of said bolt, a sliding contact bar, means arranged intermediate said movable member and contact bar whereby the movement of one will throw the other in the opposite direction, and, resiliently actuated means tending normally to throw said contact bar inwardly, and through said intermediate means throw said slidable member outwardly against said keeper, an alarm, and electrical connections including said alarm, the circuit through which is closed by said contact bar.

4. The combination with a casing adapted to be attached to a door, of a bolt, means to throw the bolt to a locked or unlocked position, an alarm, a movable member, and means whereby the member may cause the alarm to sound when the door is opened comprising a stationary contact, a slidable contact bar, coöperating with said stationary contact, an actuating device between said movable member and said bar, and an electric circuit including said bar.

5. In a lock, the combination with a casing and a bolt, of means whereby the bolt may be thrown to a locked or unlocked position, a keeper, a member adapted to engage a part of the keeper to limit the movement of said member, a slidingly held contact bar, a spring normally forcing said bar in one direction, a lever engaging the bar and member and serving to constrain the same to move in opposite directions, an electrical circuit, an alarm included in said circuit, and means whereby the contact bar may be made to close the circuit through the alarm.

6. The combination with a casing, of a bolt slidingly held in said casing, means whereby the bolt may be thrown to a locked or unlocked position, a keeper, a member having a head adapted to engage the keeper to limit the movement of said member when the bolt is thrown to a locked position, said member having a part provided with a slot, a projection carried by the bolt and entering the slot and adapted to force the member away from the keeper when the bolt is thrown to a released position, a sliding bar forming a contact and guided within the casing, a lever pivotally held in the casing and having its ends engaging parts of the member and bar to constrain the said member and bar to move in opposite directions, a contact arranged in the path of said bar, a spring tending normally to force the bar into engagement with said contact, an electric circuit, a signal in said circuit and said circuit adapted to be closed by the bar when the same is forced inwardly by the spring, a projection on the casing serving to guide the bar, a projection on the bolt also serving to guide the bar, and a second projection on the bolt serving to hold the lever in position in the casing.

7. The combination with a casing, of a bolt slidingly held in said casing, means whereby said bolt may be thrown to a locked or unlocked position, a keeper, a member having a head adapted to engage the keeper to limit the movement of said member when the bolt is thrown in a locked position, said member having a part provided with a slot, and a projection carried by the bolt and entering the slot and adapted to force the member away from the keeper when the said bolt is thrown to a released position, an alarm, and a slidable bar operatively connected to said member and means controlled by said bar to sound the alarm when the member is forced outward free of the keeper.

8. The combination with a casing, of a bolt slidingly held in said casing, means whereby said bolt may be thrown to a locked or unlocked position, a keeper, a member having a head adapted to engage the keeper to limit the movement of said member when the bolt is thrown in a locked position, said member having a part provided with a slot, a projection carried by the bolt and entering the slot and adapted to force the member away from the keeper when the said bolt is thrown to a released position, a sliding bar forming a contact and guided within the casing, a lever pivotally held in the casing and having its ends engaging parts of the member and said bar to constrain the said member and bar to move in opposite directions, a contact arranged in the path of said bar, a spring tending normally to force the bar into engagement with said contact, an electric circuit, and a signal in said circuit and said circuit adapted to be closed by the bar when the same is forced inwardly by the spring.

Signed at New York in the county of New York and State of New York this 23rd day of September A. D. 1908.

MORRIS SHEINMAN.

Witnesses:
LOUIS COHEN,
MORRIS KATZ.

Copies of this patent may be obtained for five cents each, by addressing the "Commissioner of Patents, Washington, D. C."